United States Patent
Liljeroos et al.

(10) Patent No.: US 11,189,057 B2
(45) Date of Patent: Nov. 30, 2021

(54) PROVISION OF VIRTUAL REALITY CONTENT

(71) Applicant: Nokia Technologies Oy, Espoo (FI)

(72) Inventors: Ari-Pekka Liljeroos, Pirkkala (FI); Katriina Petainen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 16/756,215

(22) PCT Filed: Nov. 14, 2018

(86) PCT No.: PCT/IB2018/058939
§ 371 (c)(1),
(2) Date: Apr. 15, 2020

(87) PCT Pub. No.: WO2019/097410
PCT Pub. Date: May 23, 2019

(65) Prior Publication Data
US 2020/0279407 A1    Sep. 3, 2020

(30) Foreign Application Priority Data
Nov. 20, 2017  (EP) ..................... 17202494

(51) Int. Cl.
*G06T 11/00* (2006.01)
*G06T 3/40* (2006.01)

(52) U.S. Cl.
CPC ............. *G06T 11/00* (2013.01); *G06T 3/40* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,636,199 B2 * | 4/2020 | Clement | G06F 3/011 |
| 2004/0141014 A1 * | 7/2004 | Kamiwada | G06F 3/04815 |
| | | | 715/848 |
| 2016/0210780 A1 | 7/2016 | Paulovich et al. | |
| 2018/0308290 A1 * | 10/2018 | Perez | G06F 3/012 |
| 2018/0350319 A1 * | 12/2018 | Fuse | G09G 5/003 |

FOREIGN PATENT DOCUMENTS

| | | |
|---|---|---|
| DE | 10 2015 012 134 A1 | 3/2017 |
| EP | 1 363 246 A1 | 11/2003 |
| WO | WO 2009/028085 | 3/2009 |

OTHER PUBLICATIONS

Williams, Betsy, et al., "Updating orientation in large virtual environments using scaled translational gain", Symposium on Applied Perception in Graphics and Visualization, Boston, MA, Jul. 28-29, 2006, 8 pgs.

* cited by examiner

*Primary Examiner* — Yanna Wu
(74) *Attorney, Agent, or Firm* — Harrington & Smith

(57) ABSTRACT

An apparatus and method is disclosed including circuitry configured to provide virtual reality video content in a virtual space, circuitry configured to determine selection of an object of interest in the virtual space, and circuitry configured to scale a representation of a user in the virtual space based at least on a distance V in the virtual space between the user and the object of interest.

20 Claims, 11 Drawing Sheets

PROVISION OF VIRTUAL REALITY CONTENT

CROSS REFERENCE TO RELATED APPLICATION

This patent application is a U.S. National Stage application of International Patent Application Number PCT/IB2018/058939 filed Nov. 14, 2018, which is hereby incorporated by reference in its entirety, and claims priority to EP 17202494.5 filed Nov. 20, 2017.

FIELD OF THE INVENTION

This invention relates to virtual reality, particularly the provision of virtual reality content for display at a user display system, e.g. a virtual reality headset.

BACKGROUND

Virtual reality (VR) is a rapidly developing area of technology in which video content is provided, e.g. streamed, to a virtual reality display system. The virtual reality display system may be provided with a live or stored feed from a video content source, the feed representing a virtual reality space (also known as world) for immersive output through the display system. In some embodiments, audio is provided, which may be spatial audio. A virtual space is any computer-generated version of a space, for example a captured real world space, in which a user can be immersed through a display system such as a virtual reality headset. A virtual reality headset may be configured to provide virtual reality video and audio content to the user, e.g. through the use of a pair of video screens and headphones incorporated within the headset.

Position and/or movement of the user device can enhance the immersive experience. Currently, most virtual reality headsets use so-called three degrees of freedom (3 DoF) which means that the head movement in the yaw, pitch and roll axes are measured and determine what the user sees. This facilitates the scene remaining largely static in a single location as the user rotates their head. A next stage may be referred to as 3 DoF+, which may facilitate limited translational movement in Euclidean space in the range of, e.g. tens of centimetres, around a location. A yet further stage is a six degrees of freedom (6 DoF) virtual reality system, where the user is able to freely move in the Euclidean space and rotate their head in the yaw, pitch and roll axes. Six degrees of freedom virtual reality systems and methods will enable the provision and consumption of volumetric virtual reality content.

Volumetric virtual reality content comprises data representing spaces and/or objects in three-dimensions from all angles, enabling the user to move fully around the spaces and/or objects to view them from any angle. For example, a person or object may be fully scanned and reproduced within a real-world space. When rendered to a virtual reality headset, the user may 'walk around' the person or object and view them from the front, the sides and from behind.

For the avoidance of doubt, references to virtual reality are also intended to cover related technologies such as augmented reality (AR).

SUMMARY

A first aspect provides an apparatus comprising: means for providing virtual reality video content in a virtual space; means for determining selection of an object of interest in the virtual space; and means for scaling a representation of a user in the virtual space based at least on a distance V in the virtual space between the user and the object of interest.

The means for scaling the representation of the user in the virtual space may be arranged such that the representation of the user in the virtual space is scaled based on a distance P between a physical location of the user in the real-world space and a boundary in the real-world space.

The apparatus may further comprise: means for determining a scaling factor, wherein the scaling factor is proportional to V/P; and wherein the means for scaling the representation of the user in the virtual space is arranged to scale the representation of the user in the virtual space based on the scaling factor.

The means for scaling the representation of the user may be arranged to scale the representation of the user in the virtual space by increasing a speed at which the representation of the user traverses the virtual space towards the object of interest.

The means for scaling the representation of the user may be arranged to decrease the speed at which the representation of the user traverses the virtual space towards the object of interest in response to determining that the representation of the user has traversed the virtual space to a location less than a threshold distance from the object of interest.

The means for scaling the representation of the user may be arranged to continuously decrease the speed at which the representation of the user traverses the virtual space as the representation of the user moves closer to the object of interest in the virtual space.

The means for scaling the representation of the user may be arranged to scale the representation of the user by increasing a height of the representation of the user in the virtual space such that the user perceives an increase in their height.

The means for scaling the representation of the user may be arranged to decrease the height of the representation of the user in the virtual space in response to determining that the representation of the user has traversed the virtual space to a location less than a threshold distance from the object of interest.

The means for scaling the representation of the user may be arranged to continuously decrease the height of the representation of the user as the representation of the user moves closer to the object of interest in the virtual space.

The means for determining selection of an object of interest may be arranged to determine selection of the object of interest by determining a gesture of the user indicating selection of the object of interest.

The means for determining selection of an object of interest may be arranged to determine selection of the object of interest by using at least one of gaze tracking or head tracking of the user.

The means for determining selection of an object of interest may be arranged to determine selection of the object of interest based on a duration of time which at least part of the user has been in a particular orientation and/or location.

The means for determining selection of an object of interest may be arranged to determine selection of the object of interest by: determining an orientation of the user in virtual space; and selecting an object in front of the user in virtual space as the object of interest.

A further aspect provides a method comprising: providing virtual reality video content in a virtual space; determining selection of an object of interest in the virtual space; and scaling a representation of a user in the virtual space based at least on a distance V in the virtual space between the user and the object of interest.

A further aspect provides a computer program comprising instructions that when executed by a computer cause it to perform: providing virtual reality video content in a virtual space; determining selection of an object of interest in the virtual space; and scaling a representation of a user in the virtual space based at least on a distance V in the virtual space between the user and the object of interest.

A further aspect provides an apparatus comprising a controller, a memory and computer-readable instructions which, when executed by the controller, cause the apparatus to: provide virtual reality video content in a virtual space; determine selection of an object of interest in the virtual space; and scale a representation of a user in the virtual space based at least on a distance V in the virtual space between the user and the object of interest.

BRIEF DESCRIPTION OF THE DRAWINGS

The invention will now be described, by way of non-limiting example, with reference to the accompanying drawings, in which.

DETAILED DESCRIPTION

Example embodiments herein relate to virtual reality (VR) and in particular to the provision of volumetric 3 D spaces (also known as worlds), or indeed any form of virtual reality content, to one or more users using a user device, such as a virtual reality display system. However, the methods and systems described herein are not limited as such, and can be used in any virtual reality application, including augmented reality (AR) Similar to virtual reality, augmented reality refers to the superposition of computer-generated content over a real-world space such that the computer-generated content appears to a user to exist in the real-world space. In one augmented reality example, a computer-generated virtual object such as a virtual tree may be presented to a user in a real-world space using a virtual/augmented reality user device such as a headset or a mobile device with a screen, such that it appears to the user that the virtual tree is located in the real-world space. Augmented reality generally relates to superimposing computer-generated content over only part of the real-world space visible to a user at a given time, whereas virtual reality generally relates to superimposing computer-generated content over substantially the entire real-world space visible to a user at a given time, such that the user is completely immersed in a virtual reality space.

More particularly, example embodiments relate to methods and systems for providing virtual reality video content to a virtual reality user device for display in a virtual space, whereby a user within a limited real-world area (e.g. a modest-sized room bounded by walls, or an area bounded by other obstacles such as furniture) can reach objects of interest in the virtual space that are initially located outside a boundary of the real-world area.

The virtual reality spaces are represented by virtual reality content data. In some example embodiments, the virtual reality content data may be stored remotely from the one or more users, and streamed to users over a network, e.g. an IP network such as the Internet. In some example embodiments, the virtual reality content data may be stored local to the one or more users on a memory device, such as a hard disk drive (HDD) or removable media such as a CD-ROM, DVD or memory stick. In some example embodiments, the virtual reality content data may be stored on a cloud-based system.

In example embodiments described herein, it is assumed that the virtual reality content data is stored remotely from one or more users, e.g. at a content server, and streamed over an IP network to one or more users. The data stream of virtual reality content data may represent one or more virtual reality spaces for immersive output through the display system. In some example embodiments, audio may also be provided, which may be spatial audio.

Figure 1:
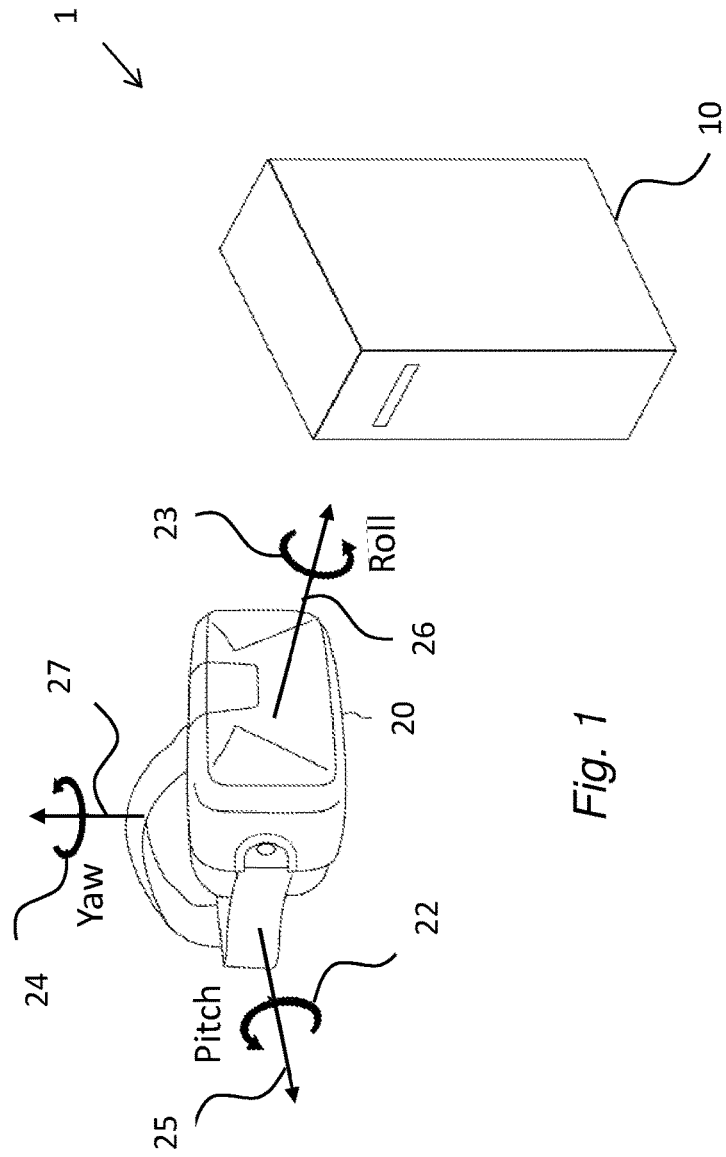
FIG. 1 is a perspective view of a virtual reality display system.

FIG. 1 is a schematic illustration of a virtual reality display system 1 which represents user-end equipment. The virtual reality system 1 includes a user device in the form of a virtual reality headset 20, for displaying visual content data for a virtual reality space, and a virtual reality media player 10 for rendering visual content data on the virtual reality headset 20. In some example embodiments, a separate user control (not shown) may be associated with the virtual reality display system 1, e.g. a hand-held controller.

In the context of this specification, a virtual space is any computer-generated version of a space, for example a captured real world space, in which a user can be immersed. In some example embodiments, the virtual space may be entirely computer-generated, i.e. not captured. The virtual reality headset 20 may be of any suitable type. The virtual reality headset 20 may be configured to provide virtual reality video and audio content data to a user. As such, the user may be immersed in virtual space.

The virtual reality headset 20 receives the virtual reality content data from a virtual reality media player 10. The virtual reality media player 10 may be part of a separate device which is connected to the virtual reality headset 20 by a wired or wireless connection. For example, the virtual reality media player 10 may include a games console, or a personal computer (PC) configured to communicate visual data to the virtual reality headset 20.

Alternatively, the virtual reality media player 10 may form part of the virtual reality headset 20.

In some examples, the virtual reality media player 10 may comprise a mobile phone, smartphone or tablet computer configured to play content through its display. For example, the virtual reality media player 10 may be a touchscreen device having a large display over a major surface of the device, through which video content can be displayed. The virtual reality media player 10 may be inserted into a holder of a virtual reality headset 20. With such virtual reality headsets 20, a smart phone or tablet computer may display visual data which is provided to a user's eyes via respective lenses in the virtual reality headset 20. The virtual reality display system 1 may also include hardware configured to convert the device to operate as part of virtual reality display system 1. Alternatively, the virtual reality media player 10 may be integrated into the virtual reality headset 20. The virtual reality media player 10 may be implemented in software. In some example embodiments, a device comprising virtual reality media player software is referred to as the virtual reality media player 10.

The virtual reality display system 1 may include means for determining the spatial position of the user and/or orientation of the user's head, for example in six degrees of freedom. This may be by means of determining the spatial position and/or orientation of the virtual reality headset 20. Over successive time frames, a measure of movement may therefore be calculated and stored. Such means may comprise part of the virtual reality media player 10. Alternatively, the means may comprise part of the virtual reality headset 20. For example, the virtual reality headset 20 may incorporate motion tracking sensors which may include one or more of gyroscopes, accelerometers and structured light systems. These sensors generate position data from which a current visual field-of-view (FOV) is determined and updated as the user, and so the virtual reality headset 20, changes position and/or orientation. The virtual reality headset 20 (or another part of the virtual reality display system 1) may comprise gaze tracking means used to determine a direction of the user's gaze, which can be used to determine an object of interest the user is looking at. The virtual reality headset 20 (or another part of the virtual reality display system 1) may comprise other limb tracking means to determine the position or orientation of a limb of the user.

The virtual reality headset 20 may comprise two digital screens for displaying stereoscopic video images of the virtual space in front of respective eyes of the user, and also two speakers for delivering audio, if provided from the virtual reality media player 10. The virtual reality headset 20 may comprise one or more cameras. Images from the one or more cameras may be presented to the user through the screens of the virtual reality headset 20 such that the real world environment is displayed to the user in a "see-through mode", or an augmented reality mode.

The example embodiments herein, which primarily relate to the delivery of virtual reality content, are not limited to a particular type of virtual reality headset 20.

In some example embodiments, the virtual reality display system 1 may determine the spatial position and/or orientation of the user's. As shown in FIG. 1, these may include measurements of pitch 22, roll 23 and yaw 24 and also translational movement in Euclidean space along side-to-side, front-to-back and up-and-down axes 25, 26, 27 (i.e. six degrees of freedom).

The virtual reality display system 1 may be configured to display virtual reality content data to the virtual reality headset 20 based on spatial position and/or the orientation of the virtual reality headset. A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a three-dimensional (3D) virtual reality environment.

In the context of volumetric virtual reality spaces, this means that the user's position can be detected relative to content provided within the volumetric virtual reality content, e.g. so that the user can move freely within a given virtual reality space, around individual objects or groups of objects, and can view the objects from different angles depending on the movement (e.g. rotation and translation) of their head in the real world. In some examples, the user may also view and explore a plurality of different virtual reality spaces and move from one virtual reality space to another one.

Audio data may also be provided to headphones provided as part of the virtual reality headset 20. The audio data may represent spatial audio source content. Spatial audio may refer to directional rendering of audio in the virtual reality space such that a detected change in the user's spatial position or in the orientation of their head may result in a corresponding change in the spatial audio rendering to reflect a transformation with reference to the space in which the spatial audio data is rendered.

The angular extent of the environment observable through the virtual reality headset 20 is called the visual field of view (FOV). The actual FOV observed by a user depends on the inter-pupillary distance and on the distance between the lenses of the virtual reality headset 20 and the user's eyes, but the FOV can be considered to be approximately the same for all users of a given display device when the virtual reality headset is being worn by the user.

Figure 2:
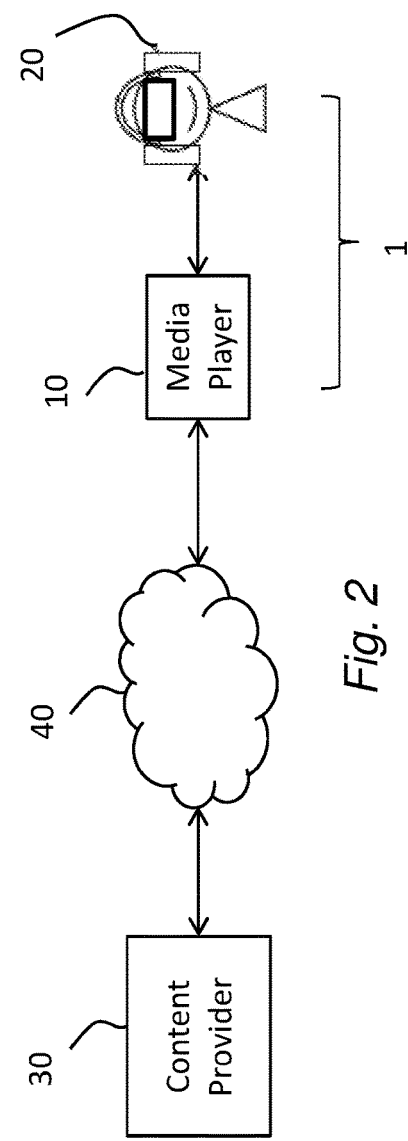
FIG. 2 is a block diagram of a computer network including the FIG. 1 virtual reality display system, in accordance with example embodiments of the invention.

Referring to FIG. 2, a remote content provider 30 may store and transmit streaming virtual reality content data which, in the context of example embodiments, is volumetric virtual reality content data for output to the virtual reality headset 20. Responsive to receive or download requests sent by the virtual reality media player 10, the content provider 30 streams the virtual reality data over a data network 40, which may be any network, for example an IP network such as the Internet.

The remote content provider 30 may or may not be the location or system where the virtual reality video is captured, created and/or processed.

For illustration purposes, we may assume that the content provider 30 also captures, encodes and stores the virtual reality content, as well as streaming it responsive to signals from the virtual reality display system 1.

Figure 3:
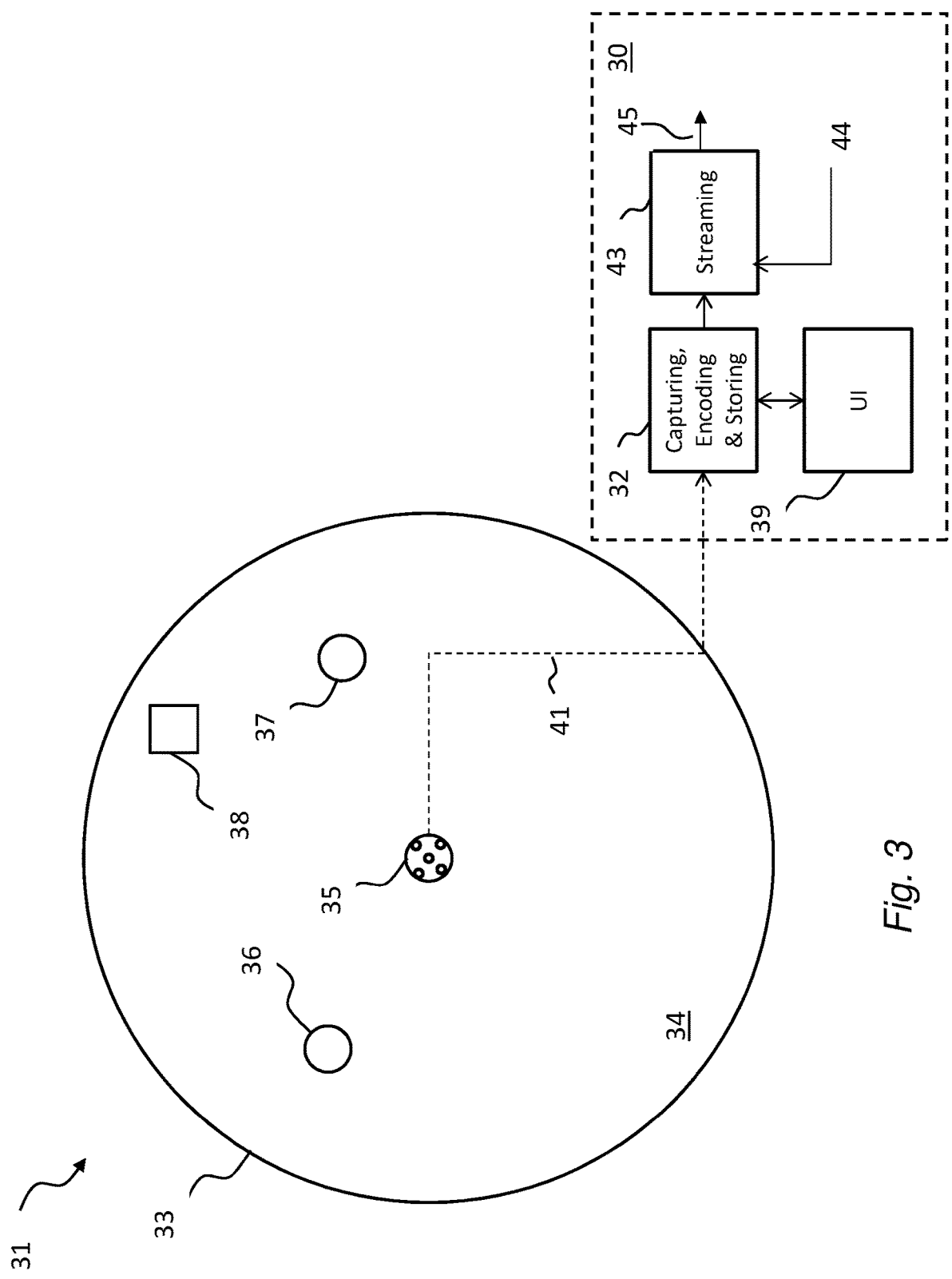
FIG. 3 is a schematic diagram of an example, conventional virtual reality capture scenario.

Referring to FIG. 3, an overview of an exemplary virtual reality capture scenario 31 is shown. The virtual reality capture scenario 31 is shown together with a capturing, encoding and storing module 32 and an associated user interface 39. FIG. 3 shows in plan-view a real world space 33 which may be for example a concert hall or other music venue. The capturing, encoding and storing module 32 is applicable to any real world space, however. A virtual reality capture device 35 for video and possibly spatial audio capture may be supported on a floor 34 of the real-world space 33 in front of one or more objects 36, 37, 38. The objects 36, 37, 38 may be static objects or may move over time. One or more of the objects 36, 37, 38 may be a person. One or more of the objects 36, 37, 38 may be furniture. One or more of the objects 36, 37, 38 may generate audio, e.g. a singer, a performer or a musical instrument.

The position of the virtual reality capture device 35 may be known, e.g. through predetermined positional data or signals derived from a positioning tag on the virtual reality capture device. The virtual reality capture device 35 in this example may comprise multiple cameras distributed around a body of the virtual reality capture device and a microphone array configured to provide spatial audio capture.

One or more of the objects 36, 37, 38 may carry a positioning tag. A positioning tag may be any module capable of indicating through data its respective spatial position to the capturing, encoding and storing module 32. For example a positioning tag may be a high accuracy indoor positioning (HAIP) tag which works in association with one or more HAIP locators within the space 33. HAIP systems use Bluetooth Low Energy (BLE) communication between the tags and the one or more locators. For example, there may be four HAIP locators mounted on, or placed relative to, the virtual reality capture device 35. A respective HAIP locator may be to the front, left, back and right of the virtual reality capture device 35. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The capturing, encoding and storing module 32 is a processing system, possibly having an associated user interface (UI) 39 which may be used by an engineer or mixer to monitor and/or modify any aspect of the captured video and/or audio. As shown in FIG. 3, the capturing, encoding and storing module 32 receives as input from the virtual reality capture device 35 spatial video data (and possibly audio data) and positioning data, through a signal line 41. Alternatively, the positioning data may be received from a HAIP locator. The capturing, encoding and storing module 32 may also receive as input from one or more of the objects 36, 37, 38 audio data and positioning data from respective positioning tags through separate signal lines. The capturing, encoding and storing module 32 generates and stores the virtual reality video and audio data for output to a user device 19, such as the virtual reality system 1 shown in FIGS. 1 and 2, via a signal line 45.

The input audio data may be multichannel audio in loudspeaker format, e.g. stereo signals, 4.0 signals, 5.1 signals, Dolby Atmos (RTM) signals or the like. Instead of loudspeaker format audio, the input may be in the multi microphone signal format, such as the raw eight signal input from the Nokia OZO (®) virtual reality camera, if used for the virtual reality capture device 35. The microphone signals can then be rendered to loudspeaker or binaural format for playback.

Associated with the capturing, encoding and storing module 32 is a streaming system 43, for example a streaming server. The streaming system 43 may be an entirely separate system from the capturing, encoding and storing module 32. Signal line 44 indicates an input received over the network 40 from the virtual reality system 1. The virtual reality system 1 indicates through such signalling the data to be streamed dependent on position and/or orientation of the virtual reality display device 20. Reference numeral 45 indicates the signal line to the network 40.

Figure 4:
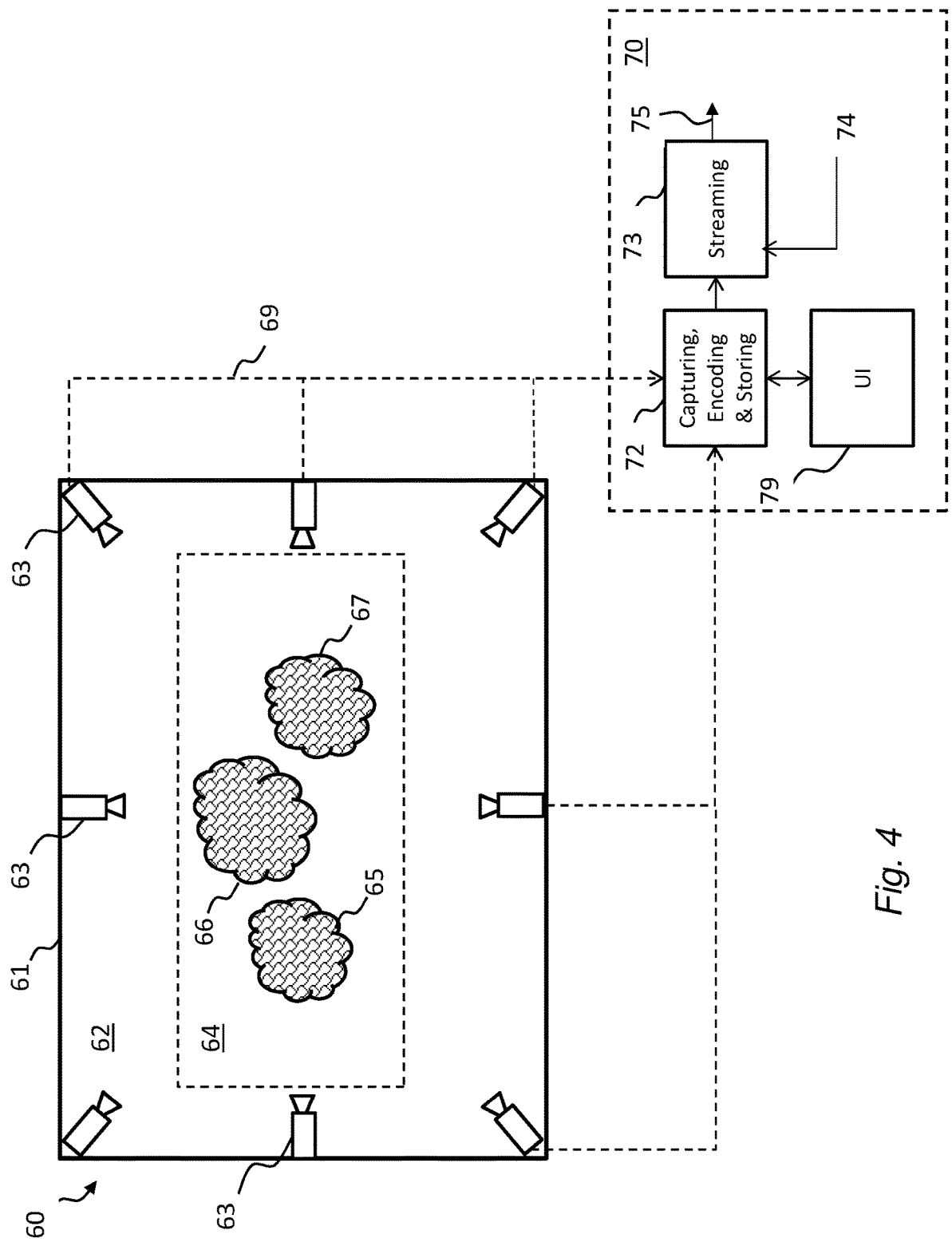
FIG. 4 is a schematic diagram of a further virtual reality capture scenario for capturing volumetric virtual reality content, in accordance with example embodiments.

Referring to FIG. 4, an overview of a volumetric virtual reality capture scenario 60 is shown according to some embodiments. The capture scenario 60 is shown together with processing modules provided at a content provider system 70, including a capturing, encoding and storing module 72 and an associated user interface 79, which is optional. FIG. 4 shows in plan-view a real world space 61 which may be for example a garden comprising three trees 65, 66, 67. The capturing, encoding and storing module 72 is applicable to any real world space, however. In this case, multiple cameras 63 are positioned around the real-world space 61 (and may be positioned at different heights) so as to capture video from a focal capture zone 64 from all sides in order to generate a full three-dimensional representation of the objects 65, 66, 67 within the focal capture zone. It will be appreciated that a greater, or a fewer number of cameras 63 may be provided in practice. In some example embodiments, one or more microphones (not shown) may also be provided for capturing spatial audio. The dimensions of the focal capture zone 64 may be larger or smaller.

Similar to the FIG. 3 scenario, the capturing, encoding and storing module 72 is a processing system which may have an associated user interface (UI) 79 which may be used by an engineer or mixer to monitor and/or modify any aspect of the captured video and/or audio. As shown in FIG. 4, the capturing, encoding and storing module 72 receives as input from the cameras 63 the video data. The video data may be received using signal line(s) 69, only a subset of which are shown, and/or by wireless means. The respective position of each camera 63 may be predetermined, or, in some example embodiments, each camera may have an associated positioning tag (e.g. a HAIP positioning tag) used to indicate the position of each camera in the real-world space 61. If audio data is provided, the capturing, encoding and storing module 72 may also receive as input audio data using wired or wireless means. The capturing, encoding and storing module 72 processes the received video data, and possibly audio data, to generate using known techniques a volumetric three-dimensional space representing the focal capture zone 64. This captured virtual reality space is stored for output to a user device, such as the virtual reality system 1 via signal line 75.

Similar to the FIG. 3 scenario, if audio is captured, the audio data may be multichannel audio in loudspeaker format, e.g. stereo signals, 4.0 signals, 5.1 signals, Dolby Atmos (®) signals or the like. Instead of loudspeaker format audio, the input may be in the multi microphone signal format, such as the raw eight signal input. The microphone signals can then be rendered to loudspeaker or binaural format for playback.

Similar to the FIG. 3 scenario, associated with the capturing, encoding and storing module 72 is a streaming system 73, for example a streaming server. The streaming system 73 may be an entirely separate system from the capturing, encoding and storing module 72. Signal line 74 indicates an input received over the network 40 from the virtual reality system 1. As will be explained, the virtual reality system 1 indicates through such signalling video data to be streamed dependent on position and/or orientation of the virtual reality headset 20 within a corresponding virtual reality space. Reference numeral 75 indicates the signal line to the network 40.

In some examples, the capturing, encoding and storing module 72 stores a plurality of virtual spaces, each of which may be represented by different volumetric virtual reality content.

Figure 5:
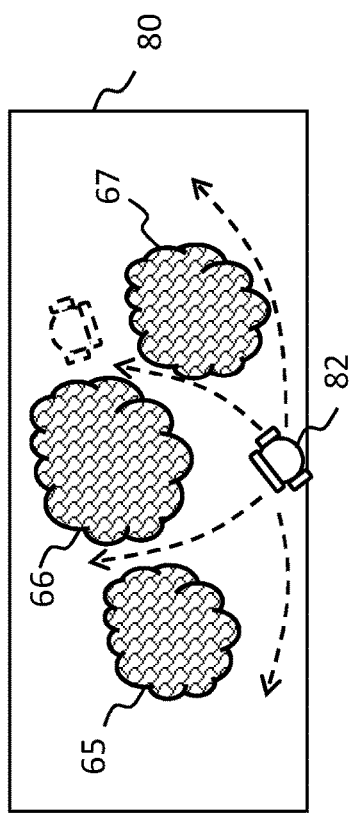
FIG. 5 is a top plan view of a first virtual space, and overlaid first and second positions of a user immersed in the first virtual space.

FIG. 5 shows in top-plan view an example virtual space 80, captured using, for example, the FIG. 4 scenario 60, although other methods of generating the virtual space may be used. The virtual space 80 comprises a three-dimensional, volumetric representation of a garden comprising the first, second and third trees 65, 66, 67. Also shown is the relative position of a user 82 wearing the virtual reality headset 20 when in a first position and in a subsequent, second position indicated by broken lines. The broken arrows indicate that the user 82 may move freely around the trees 65, 66, 67 and view them from all directions and orientations.

Figure 6:
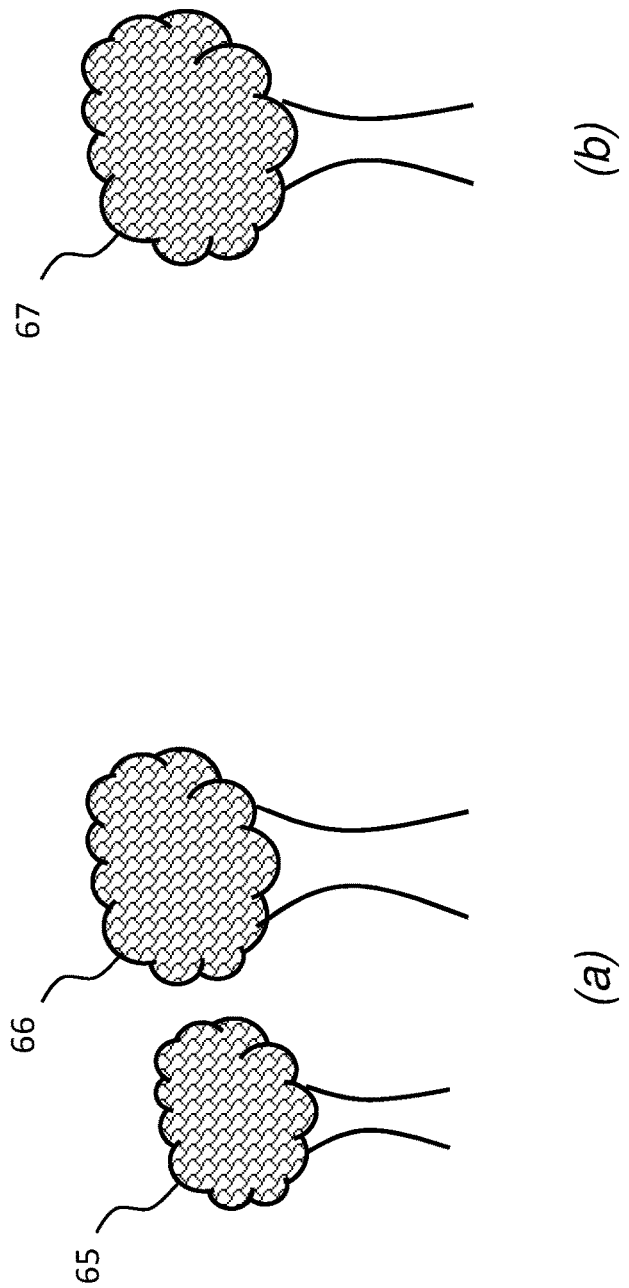
FIGS. 6a and 6b are user viewpoints of the FIG. 5 first virtual space at the respective first and second positions.

FIG. 6a is a graphical view of virtual reality content data which is rendered to the virtual reality headset 20 when the user 82 is in the first position. Particularly, the three-dimensional image that is rendered to the virtual reality headset 20 will be the first and second trees 65, 66. FIG. 6b is a graphical view of what is rendered to the virtual reality headset 20 when the user 82 is in the second position, having rotated their body towards the rear of the third tree 67.

Figure 7:
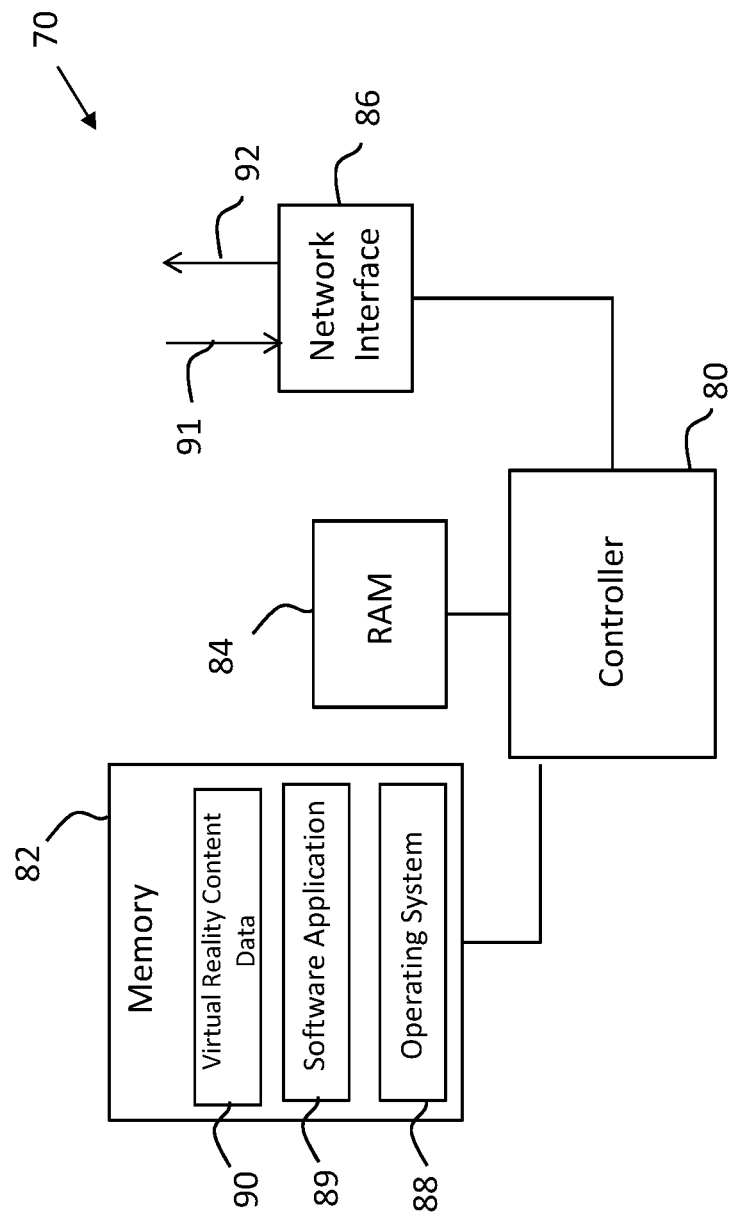
FIG. 7 is a schematic diagram of components of a content provider system shown in FIG. 4.

FIG. 7 is a schematic diagram of components of the content provider system 70. The content provider system 70 may have a controller 80, a memory 82 and random-access memory (RAM) 84. The content provider system 70 may comprise a network interface 86 for connection to the network 40, e.g. a modem which may be wired or wireless. The content provider system 70 may also receive positional signals from the virtual reality headset 20 over signal line 74 and outputs streaming content for one or more virtual spaces over signal line 75. The positional signals may be indicative of user position/orientation. The output signals to the display device 10 will be the virtual reality content data. The controller 80 is connected to each of the other components in order to control operation thereof.

The memory 82 may be a non-volatile memory such as read only memory (ROM), a hard disk drive (HDD) or a solid state drive (SSD). The memory 82 stores, amongst other things, an operating system 88 and may store software applications 89. The random-access memory 84 is used by the controller 80 for the temporary storage of data. The operating system 88 may contain code which, when executed by the controller 80 in conjunction with the random-access memory 84, controls operation of each of the hardware components.

Additionally, the memory 82 stores a set of virtual content items 90 (hereafter "virtual items") which may be a library of virtual items arranged in any suitable form. The virtual items 90 may comprise three-dimensional volumetric items, for example virtual spaces and/or objects.

The controller 80 may take any suitable form. For instance, it may be a microcontroller, plural microcontrollers, a processor, or plural processors.

In some example embodiments, the content provider system 70 may also be associated with external software applications or virtual reality content data not stored on the memory 82. These may be applications or virtual reality content data stored on a remote server device and may run partly or exclusively on the remote server device. These applications or virtual reality content data may be termed cloud-hosted applications or data. The content provider system 70 may be in communication with the remote server device in order to utilize the software application or data stored there.

In some example embodiments, the components shown in FIG. 7 may be provided at the media player 10 (without the need for the network interface 86) so that the functionality described herein is provided locally rather than remotely.

One software application 89 provided on the memory 82 is for controlling what is transmitted and rendered to the virtual reality system 1.

Real-world spaces such as those in which a user will be wearing the virtual reality headset 20 are usually limited in size. In general, limitations of the real-world space, also known as physical space/environment, may detract from the user experience and, in some cases, may make it difficult to consume content in a virtual space, for example if a six degrees of freedom virtual space represented by the virtual content is larger than the real-world space or extends outside the real-world space. A user wishing to explore a relatively large virtual space may become tired or disinterested if they have to walk a large distance between different portions of virtual content. Moreover, certain parts of the virtual space may be unreachable if the user is limited by the real-world space, for example by walls forming a boundary of the real-world space.

Embodiments herein comprise methods and systems providing scaling of a representation of a user in a virtual space. For example, there may be provided virtual reality video content in a virtual space. Selection of an object of interest in the virtual space may be determined. A representation of a user in the virtual space may be scaled based on a distance V in virtual space between the user and the object of interest.

The above operations, and other operations to be described below, may be performed by the controller 80 under software control, for example under control of the software application 89 which may perform said operations.

Figure 8:
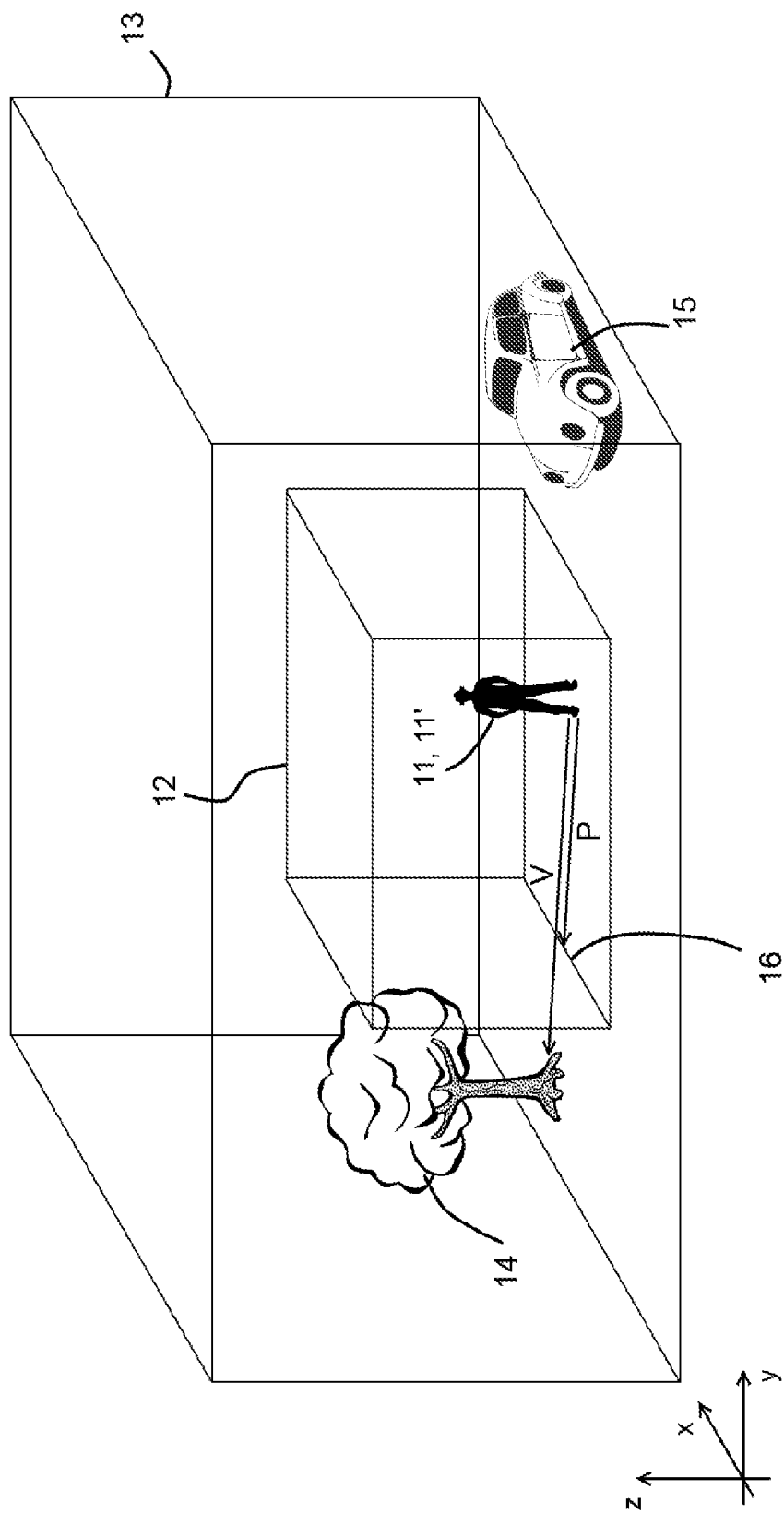
FIG. 8 is a perspective view of a real-world space and a corresponding virtual space which a user may explore using 6 degrees-of-freedom (6 DoF)

FIG. 8 schematically illustrates an exemplary relationship between a real-world space 12, in which a user 11 is located, and a virtual space 13, according to example embodiments.

The real-world space 12 is at least a portion of the physical environment in which the user 11 is located. The virtual space 13 is a space in which the user 11 is immersed due to the provision of virtual reality video content to the user 11. The virtual space 13 and the real-world space 12 overlap at least in part. In other words, at least a part of the virtual space 13 is co-located with at least a part of the real-world space 12, such that a user 11 traversing the real-world space 12 is able to traverse at least a corresponding part of the virtual space 13. The virtual space 13 may be mapped to the real-world space 12 by various techniques known in the art.

The virtual space 13 may have one or more dimensions that are larger than the corresponding dimensions of the real-world space 12. That is, the virtual space may be larger in at least one extent than the real-world space 12 in which the user 11 is located. FIG. 8 shows that the virtual space 13 extends beyond the real-world space 12 in three dimensions, along the x axis, and y axis and z axis, however the virtual space 13 in other cases may extend beyond the real-world space 12 in a different number of dimensions such as one dimension or two dimensions.

The virtual space 13 may contain one or more virtual objects such as object 14 and object 15, represented by virtual video content. In this particular example, object 14 is a tree, while object 15 is a car. In accordance with known position and/or movement determination methods, the user 11 may move within the virtual space 13 with six degrees of freedom. As the user 11 moves through the real-world space 12, a corresponding movement is made in the virtual space 13, with video content corresponding to the new location in the virtual space 13 being provided to the user 11. As such, the user 11 perceives they are moving in the virtual space 13 and are immersed in a virtual environment. If the user 11 moves in the real-world space 12 towards the object 14, then a corresponding movement may be made in the virtual space 13 such that the user 11 experiences they are moving towards the object 14.

The virtual space 13 comprises a representation of the user 11'. Movements of the user 11 in the real-world space 12 are translated into corresponding movements of the representation of the user 11' in the virtual space 13. The location of the representation of the user 11' in the virtual space 13 may be mapped to the location of the user 11 in the real-world space 12. The representation of the user 11' and the user 11 may be co-located in the real-world space 12, as shown in the example of FIG. 8. In some examples, the representation of the user 11' is an avatar in the virtual space 13, represented by video content. The avatar may be a virtual likeness of the user. The avatar may be humanoid, anthropomorphic, or otherwise. The avatar may be in the user's field of view, for example in front of the user 11 in the virtual space 13. The avatar appears to move through the virtual space 13 in response to corresponding movements made by the user 11 in the real-world space 12. In other examples, the representation of the user 11' may be a viewport into the virtual space 13, such that the user 11 experiences the virtual space 13 in the first person. The viewport will have a location within the virtual space 13, which may have six degrees of freedom. The user 11 will perceive their height in the virtual space 13 to correspond to the height of the viewport in the virtual space 13, that is, the z-axis position of the viewport in the virtual space 13.

The real-world space 12 has a boundary 16. The boundary 16 is a limit of the real-world space 12 beyond which movement of the user 11 is restricted, prevented or prohibited. The boundary 16 may be a tangible boundary such as a wall, fence, rope, ditch, edge of a platform, obstacle, or similar. In some examples the boundary 16 is intangible, for example an invisible boundary past which a user 11 should not move. In the past, the user 11 may not have been able to reach object 14 or object 15 in the virtual space 12 since object 14 and object 15 are located in a region of the virtual space 13 outside the real-world space 12, beyond the boundary 16 of the real-world space 12. For example if the real-world space 12 were a room, the boundary 16 may comprise a wall of the room. The virtual space 13 may extend outside the room, with the virtual objects 14 and 15 being located outside the room, beyond the wall. As such, the user 11 may not have been able to reach the object 14 or object 15 since the movement of the user 11 in the virtual space 13 is limited by the presence of the wall.

FIG. 8 shows a distance V in the virtual space 13 from the user 11 (or representation of the user 11') to the object 14. Also shown is a distance P from the user 11 to the boundary 16 of the real-world space 12. The distance P is preferably a distance between the user 11 and a point on the boundary 16 located substantially between the user 11 and the object 14, for example substantially along the same axis between the user 11 and the object 14 as the distance V. The user 11 is located on one side of the boundary 16, while the object 14 is located on a different side of the boundary 16.

Various aspects of example embodiments allow a user 11 in a real-world space 12 of a limited size to explore parts of a virtual world 13 that extend beyond a boundary of the real-world space 12. As such, the virtual space 13 does not need to be limited to the size of the real-world space. For example, a user 11 is able to navigate virtual space 13 to an object of interest located outside the real-world space 12. Various aspects of example embodiments allow the user to do so in an intuitive manner, that feels natural to the user 11.

Figure 9:
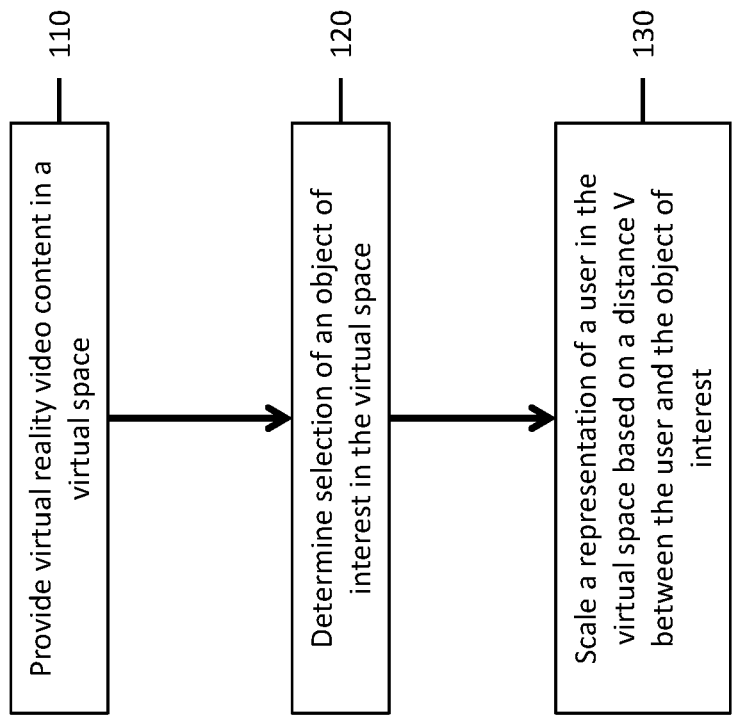
FIG. 9 is a flow diagram showing processing steps performed in accordance with example embodiments.

FIG. 9 is a flow diagram showing processing steps performed by the software application 89 according to example embodiments. Certain steps may be re-ordered, re-arranged and/or combined.

A first step 110 comprises providing virtual reality video content in a virtual space 13. This may be carried out as discussed previously. Providing virtual reality video content in the virtual space 13 may comprise determining a physical location and orientation of the user 11 or the virtual reality display system 1 in the real-world space 12, mapping the virtual space 13 to the determined physical location and orientation in the real-world space 12, and displaying virtual reality video content corresponding to the mapped virtual space 13. A user 11 located in a real-world space 12 is thus immersed in the virtual space 13.

A second step 120 comprises determining selection of an object of interest in the virtual space 13. The object of interest may be a point, area or volume in the virtual space. In some examples, the object of interest comprises one or more virtual objects in the virtual space, for example object 14 or object 15 discussed previously with respect to FIG. 8. The object of interest is a virtual object that is of interest to the user, in particular in which the user wishes to approach in virtual space. The object of interest may be located in a region of the virtual space 13 that is located outside the real-world space 12, for example beyond the boundary 16 of the real-world space 12 in which the user is located. In other words, the object of interest is at an opposite side of the boundary 16 to the user 11.

The object of interest is generally selected by the user 11, but in some examples may be selected by a different party such as a person other than the user 11, or a computer.

Determining selection of the object of interest may be by any suitable means. For example, determining selection of the object of interest may comprise determining a gesture being performed by the user 11 by any suitable gesture identification means. As an example, determining selection of the object of interest may comprise using gaze tracking of the user by a gaze tracking means. Alternatively, or in addition, determining selection of the object of interest may comprise using head tracking of the user, or another type of limb tracking, by an appropriate tracking means.

In some examples, the object of interest is selected based on the orientation of the user 11 in the real-world space 12 or virtual space 13. For example, an object substantially in front of the user 11 in virtual space 13 may be selected as the object of interest, such as an object in the user's field of view. An area in the field of view of the user 11 may also be selected as the object of interest if there are several objects in the field of view that are of interest to the user 11. If there are multiple objects in the user's field of view, the object of interest may be selected from at least one of the objects based on one or more criteria. For example, an object which is first in a row of objects may be selected as the object of interest, or the object closest to the user could be selected as the object of interest. In other examples, one or more gestures performed by the user 11 could be determined in order to determine selection of one of the objects in the field of view as the object of interest.

Determining selection of the object of interest may be based on a duration of time which at least part of the user 11 has been in a particular orientation and/or location in the real-world space 12. The part of the user 11 may, for example, be the user's head, arm, foot, hand or finger, or any other suitable limb.

A third step 130 comprises scaling a representation of the user 11' in the virtual space 13 based on a distance P between the user in a real-world space and the boundary of the real-world space.

Scaling the representation of the user 11' may comprise scaling a size and/or a speed of the representation of the user 11'.

Scaling the representation of the user 11' may comprise increasing a speed at which the representation of the user 11' traverses the virtual space 13, for example towards the object of interest. That is, the representation of the user 11' moves through the virtual space 13 at a greater speed after the scaling has been performed than before the scaling was performed. For example, the representation of the user 11' may initially move in the virtual space with a speed of 5 kph before scaling, but may move with a speed of 15 kph after scaling. The user 11 is therefore able to navigate the virtual world 13 faster than they would have previously. Scaling the representation of the user 11' may comprise increasing a speed at which the representation of the user 11' traverses the virtual space 13 is discussed later with respect to FIG. 11.

Additionally, or alternatively, scaling the representation of the user 11' may comprise increasing or decreasing a size of the representation of the user 11' in the virtual space, such as a width, breadth or height of the representation of the user 11'. In particular, scaling the representation of the user 11' may comprise increasing a height of the representation of the user 11', based on the distance V between the user 11 and the object of interest.

Where the representation of the user 11' is an avatar, scaling the representation of the user 11' may comprise increasing a height of the avatar parallel to a z-axis of the virtual space. Where the representation of the user 11' is a viewport into the virtual space 13, scaling the representation of the user 11' may comprise increasing the apparent height of the viewport in the virtual space 13 along a z-axis of the virtual space 13. Where the object of interest is located outside the real-world space 12, beyond the boundary 16, scaling the representation of the user 11' may comprise increasing the height of the representation of the user 11' such that the user 11 experiences that they have increased in height in the virtual space 13 relative to other objects in the virtual space 13. For example a user 11 experiencing an initial height of 1.8m in the virtual space 13 before scaling may experience a height of 18m in the virtual space 13 after scaling.

Scaling the representation of the user 11' by increasing a size of the representation of the user 11' in the virtual space is discussed later with respect to FIG. 12.

Figure 10:
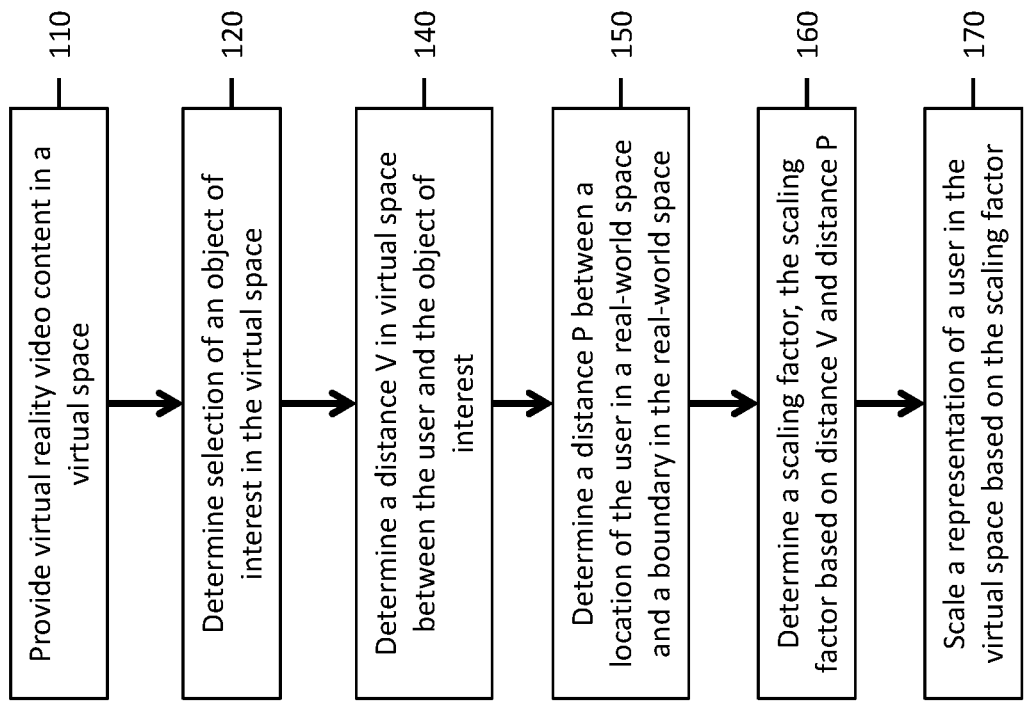
FIG. 10 is a flow diagram showing processing steps performed in accordance with example embodiments.

FIG. 10 is a flow diagram showing processing steps performed by the software application 89 according to example embodiments. Certain steps may be re-ordered, re-arranged and/or combined. The method is similar to that illustrated in FIG. 10, but with additional steps.

A first step 110 comprises providing virtual reality video content in a virtual space 13, for example as discussed previously in relation to FIG. 9.

A second step 120 comprises determining selection of an object of interest in the virtual space 13, for example as discussed in relation to FIG. 9.

A third step 140 comprises determining the distance V in virtual space between the user 11 and the object of interest. This may be performed by any suitable method. For example, the distance V may be calculated by determining a position of the user 11 in the real-world space 12 and using the mapping of the virtual space 13 to the real-world space 12 to determine a distance.

A fourth step 150 comprises determining a distance P between a physical location of the user 11 in the real-world space 12 and a boundary 16 in the real-world space 12. This may be performed using various positioning means such as tagging, or object recognition methods. The real world space 12 size may be used for determining the distance P. As discussed previously with reference to FIG. 8, the distance P is preferably a distance between the user 11 and a point on the boundary 16 located substantially between the user 11 and the object of interest.

In some examples, step 150 may be carried out before step 140. That is, the distance P may be determined first. The distance P may then be used to determine the distance V, for example by triangulation. If the location of the user 11 in the real-world space 12 is known or determined, and the virtual space 13 has been mapped to the real-world space 12, then the distance V may be calculated based on the location of the user 11 in the real-world space 12 and a location of the object of interest in the virtual space 13.

A fifth step 160 comprises determining a scaling factor based on the distance V and the distance P. Scaling of the representation of the user 11' may be based on the scaling factor. In some examples, the scaling factor is proportional to distance V divided by distance P (i.e. V/P). That is, the scaling factor is proportional to the distance between the user 11 and the object of interest, and inversely proportional to the distance between the user 11 and the boundary 16.

A sixth step 170 comprises scaling the representation of the user 11' in the virtual space 13 based on the scaling factor. Scaling the representation of the user 11' has been discussed previously with relation to FIG. 10. The representation of the user 11' may be scaled based on the scaling factor by multiplying a parameter of the representation of the user 11' by the scaling factor, for example multiplying a size of the representation of the user 11' and/or a speed of the representation of the user 11' by the scaling factor.

Figure 11:
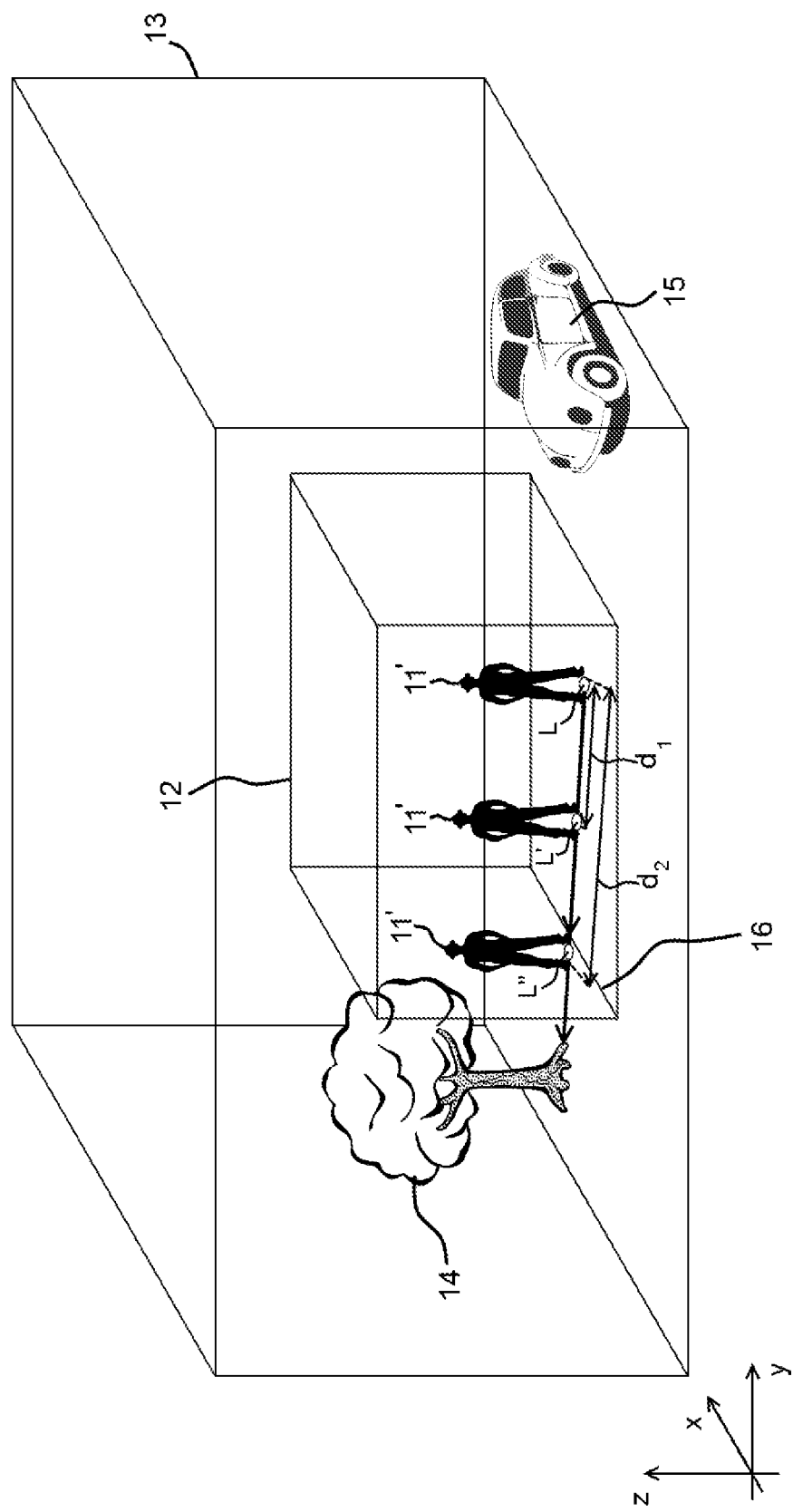
FIG. 11 is a perspective view of a user exploring the virtual space of FIG. 8 in accordance with example embodiments.

FIG. 11 illustrates the movement of the user 11 and the representation of the user 11' in the virtual space according to some example embodiments. In particular, FIG. 11 illustrates scaling the speed at which a representation of the user 11' moves in the virtual space 13 according to example embodiments.

A user 11 is initially positioned at a first location L in the real-world space 12. A representation of the user 11' in the virtual space 13 will be positioned in a corresponding first location L in the virtual space 13. For example, the representation of the user may be co-located with the user 11, or a distance in front of the user 11.

The user 11 may move a certain distance in the real-world space 12 towards an object of interest, in this case object 14. Before scaling the speed of a representation of the user 11', this may normally have resulted in the representation of the user 11' moving in the virtual space a distance $d_1$ to position L'. However, in accordance with example embodiments, the distance moved by the representation of the user 11' in the virtual space is scaled. In the example shown in FIG. 11, rather than moving distance $d_1$ to new location L', the representation of the user 11' is instead moved in virtual space 13 by distance $d_2$ to location L" in virtual space 13. The distance moved by the representation of the user 11' may be scaled based on the distance V and/or the distance P discussed previously. That is, a scaling factor may be determined based on the distance V and/or the distance P, wherein this scaling factor is applied to the distance moved by the representation of the user 11'. In some examples, the scaling factor is proportional to V. That is, as the distance V increases, so too does the scaling factor and hence the distance moved by the representation of the user 11'. Thus the distance moved by the representation of the user 11' will be greater for an object of interest 14 located a larger distance V from the user 11 than an object of interest 14 located a smaller distance V from the user 11. The result is that distant objects of interest are now easier for the user 11 to reach in the virtual space 13. In some examples, the scaling factor is inversely proportional to P. That is, as the distance P decreases, the scaling factor increases proportionally, and hence the distance moved by the representation of the user 11' increases. Thus the distance moved by the representation of the user 11' will be greater for a smaller distance P between the user 11 and the boundary 16 than for a larger distance P. The result is that distant objects of interest are now easier for the user 11 to reach in the virtual space 13, particularly when movement in the real-world space 12 is limited by a boundary 16. In one example, the scaling factor may be proportional to V/P.

Scaling the speed of the representation of the user 11' could also be considered as equivalent to scaling the distance that is moved by the representation of the user 11' in the virtual space 13, per unit of distance moved by the user 11 in the real-world space 12. For example before scaling the representation of the user 11', a movement of 1 metre by the user 11 in the real-world space 12 towards the object of interest may have resulted in a corresponding movement of 1 metre by the representation of the user 11' in the virtual space 13 towards the object of interest. After scaling, the distance travelled by the representation of the user 11' may be scaled such that the representation of the user 11' instead moves 10 metres in virtual space for every 1 metre moved by the user 11 in the real-world space 12.

Scaling the speed of the representation of the user 11' allows the user 11 to travel further in a virtual space 13 than they would otherwise be able to. As such, the user 11 is able to travel in the virtual space 13 to objects of interest that are located in a region of the virtual space 13 located outside the real-world space 12.

Figure 12:
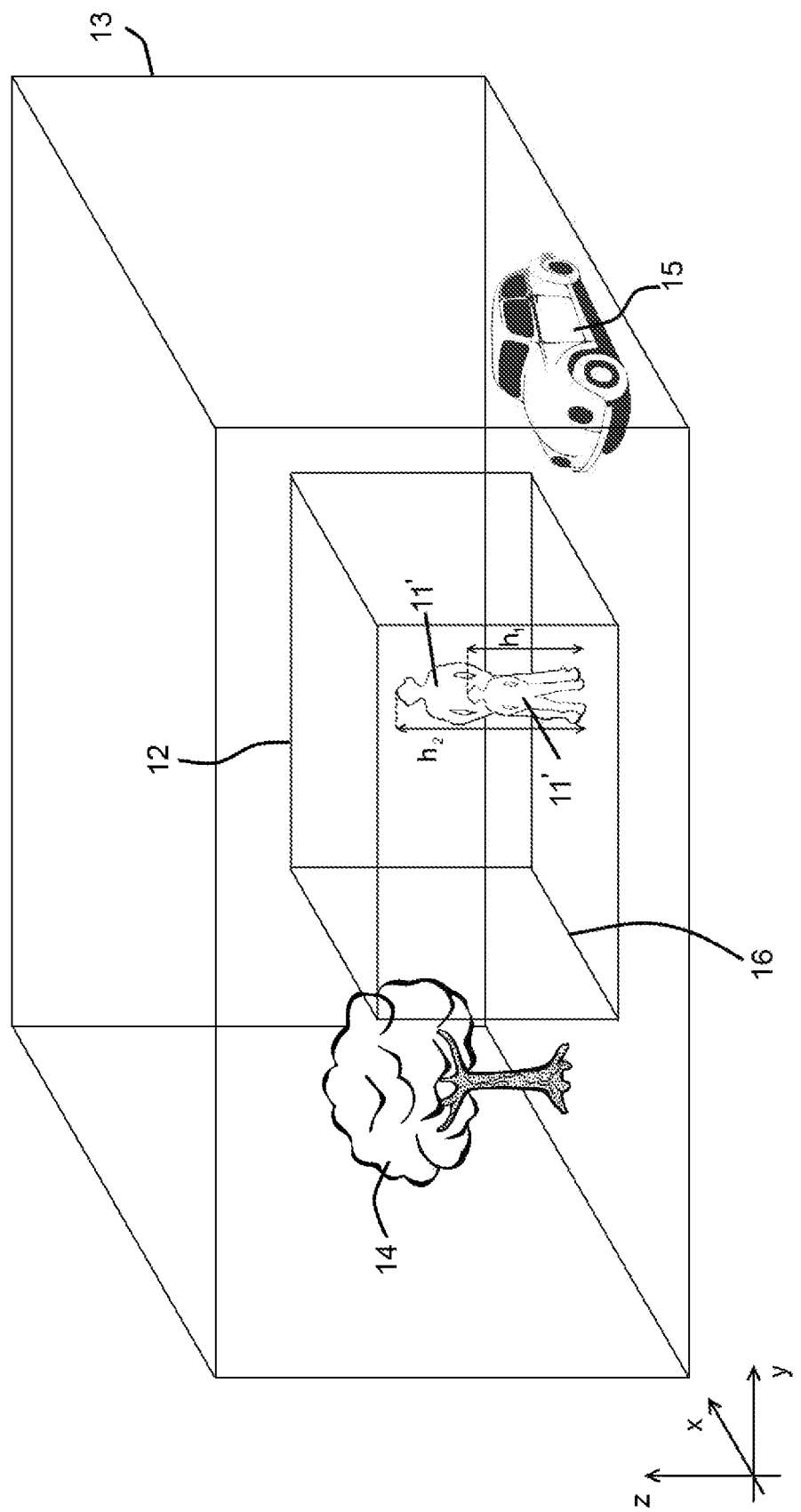
FIG. 12 is a perspective view of a representation of a user being scaled in the virtual space of FIG. 8, in accordance with example embodiments.

FIG. 12 illustrates the representation of the user 11' being scaled in size in accordance with example embodiments.

FIG. 12 shows the representation of the user 11' as an avatar, but the representation of the user 11' may be something else as discussed previously. The representation of the user 11' has an initial height $h_1$ in the virtual space 13, such as a height along the z-axis. The representation of the user 11' is subsequently scaled in the virtual space 13 as discussed previously such that the new representation of the user 11b has a new height $h_2$ greater than h1.

The scaling of the representation of the user 11' may be immediate, or may occur gradually over a period of time. For example, the representation of the user 11' may increase in height from height $h_1$ to height $h_2$ immediately, or may appear to the user 11 to increase in height from height $h_1$ to height $h_2$ over a period of time. The increase in height is such that the user 11 feels that they have increased in height with respect to the virtual space 13, in particular with respect to one or more virtual objects in the virtual space 13. Likewise, the speed of the representation of the user 11' as discussed previously may increase immediately, or gradually over a period of time.

In some example embodiments, scaling the representation of the user 11' comprises scaling both the speed and the height of the representation of the user 11'. Scaling the speed allows the user 11 to traverse a greater extent of the virtual space 13, for example to reach an object of interest beyond the boundary 16 of the real-world space 12, while additionally increasing the height of the representation of the user 11' makes travelling towards the object of interest at the increased speed feel more natural to the user 11.

After the representation of the user 11' has been scaled in the virtual space 13, the scaling may be reversed. For example, the representation of the user 11' may be returned to its original speed and/or size. According to another example, user 11 may wish to continue moving in a virtual space 13 in a scaled size and the scaling is then maintained, and may be reversed later.

Reversal of the scaling may occur based on time. For example, the scaling may be reversed after a period of time has elapsed. Reversal of the scaling may occur based on a location of the user 11 in the real-world space 12 or virtual space 13. For example, the scaling may be reversed once the user 11 has moved to a particular location in the real-world space 12 or virtual space 13. In some examples, reversal of the scaling may be based on the distance in the virtual space 13 between the user 11 (or representation of the user 11') and the object of interest, or based on the distance in the real-world space 12 between the user 11 and the boundary 16. For example, reversal of the scaling may occur as the user 11 (or representation of the user 11') approaches the object of interest. That is, as the user 11 moves in the virtual space 13 towards the object of interest, and thus as the distance V between the user 11 and the object of interest decreases, the scaling of the representation of the user 11' is reversed. The reversal of the scaling may be immediate, for example when the distance V reaches a threshold distance, or gradual, for example reversing the scaling continuously with the change in distance V. In particular wherein scaling the representation of the user 11' comprises increasing a height of the representation of the user 11', the reversal of the scaling may comprise decreasing the height of the user 11, for example back from $h_2$ to $h_1$.

Figure 13:
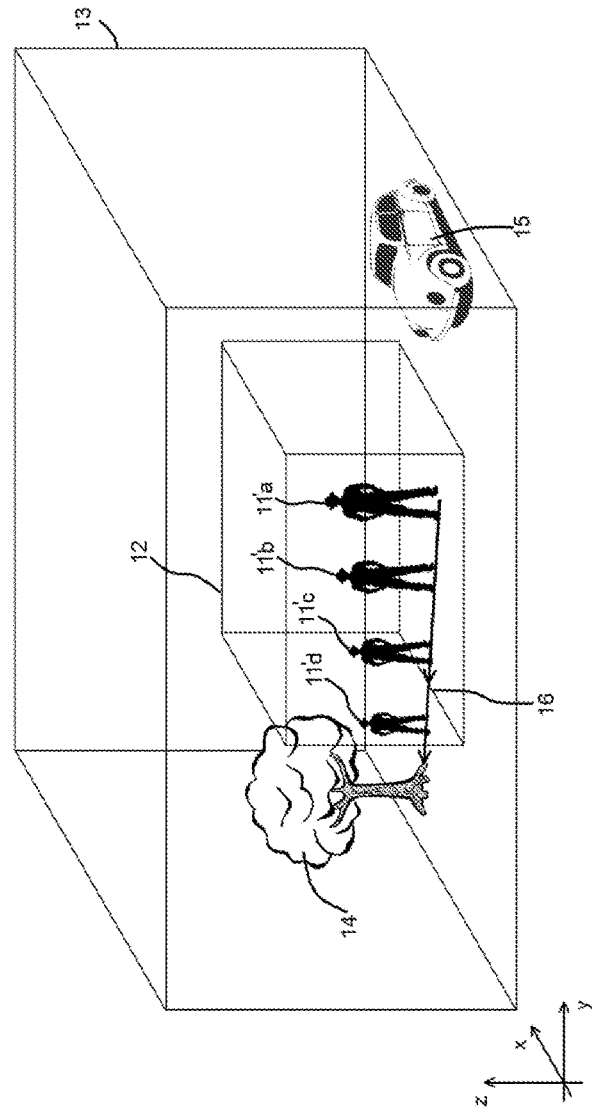
FIG. 13 is a perspective view of the scaling shown in FIG. 12 being reversed, in accordance with example embodiments.

FIG. 13 illustrates an example wherein the scaling of the representation of the user 11' is reversed as they move towards the object of interest, in this example object 14. Initially the representation of the user 11' has been scaled, in this case increased, to a first height as shown by representation of the user 11'a. As the user 11 moves towards the object of interest, in this case object 14, the distance between the user 11 (and/or representation of the user 11') and the object of interest decreases. Correspondingly, the height of the representation of the user 11'a is also decreased, as illustrated from 11'a, to 11'b, to 11'c, to 11'd. At 11'd, the representation of the user 11' may be at normal height, i.e. the original height before the scaling to 11'a occurred.

Figure 14:
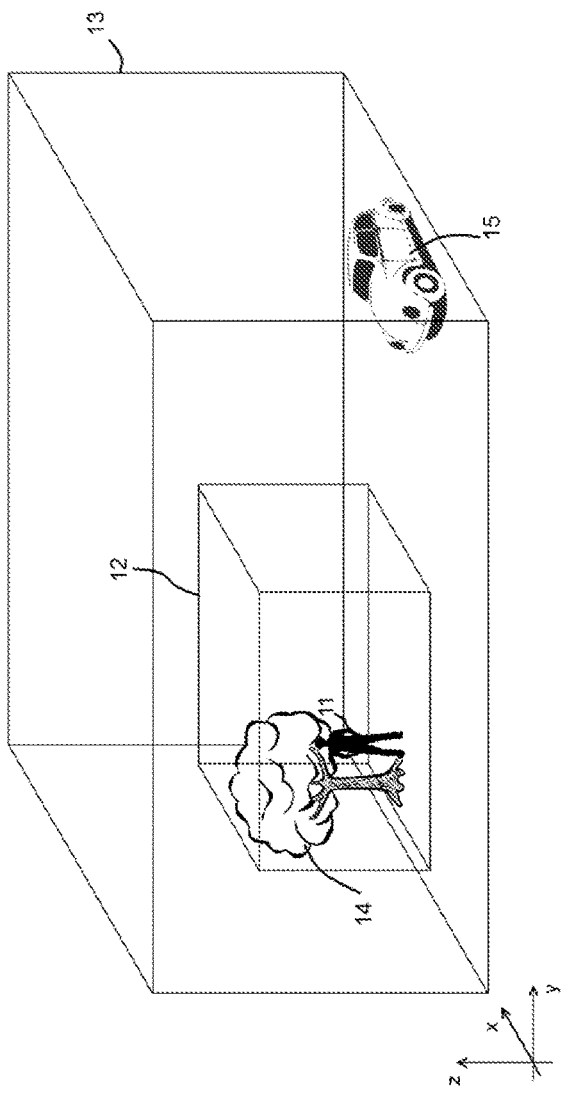
FIG. 14 is a perspective view of the virtual space of FIG. 8 being remapped to the real-world space, in accordance with example embodiments.

FIG. 14 illustrates how after the user 11 has reached the object of interest (i.e. object 14) as discussed previously, the virtual space 13 may be re-mapped to the real-world space 12. Comparing FIG. 14 to FIG. 8, it can be seen that the user 11 remains within the real-world space 12, but the virtual space 13 has now been re-mapped to the real-world space such that the object 14 is now located within the real-world space 12. Aforementioned exemplary embodiments that allowed the user 11 to reach the object 14 (tree) may now allow the user 11 to reach the object 15 (car) located in the virtual space 13, but outside the real-world space 12.

Figure 15:
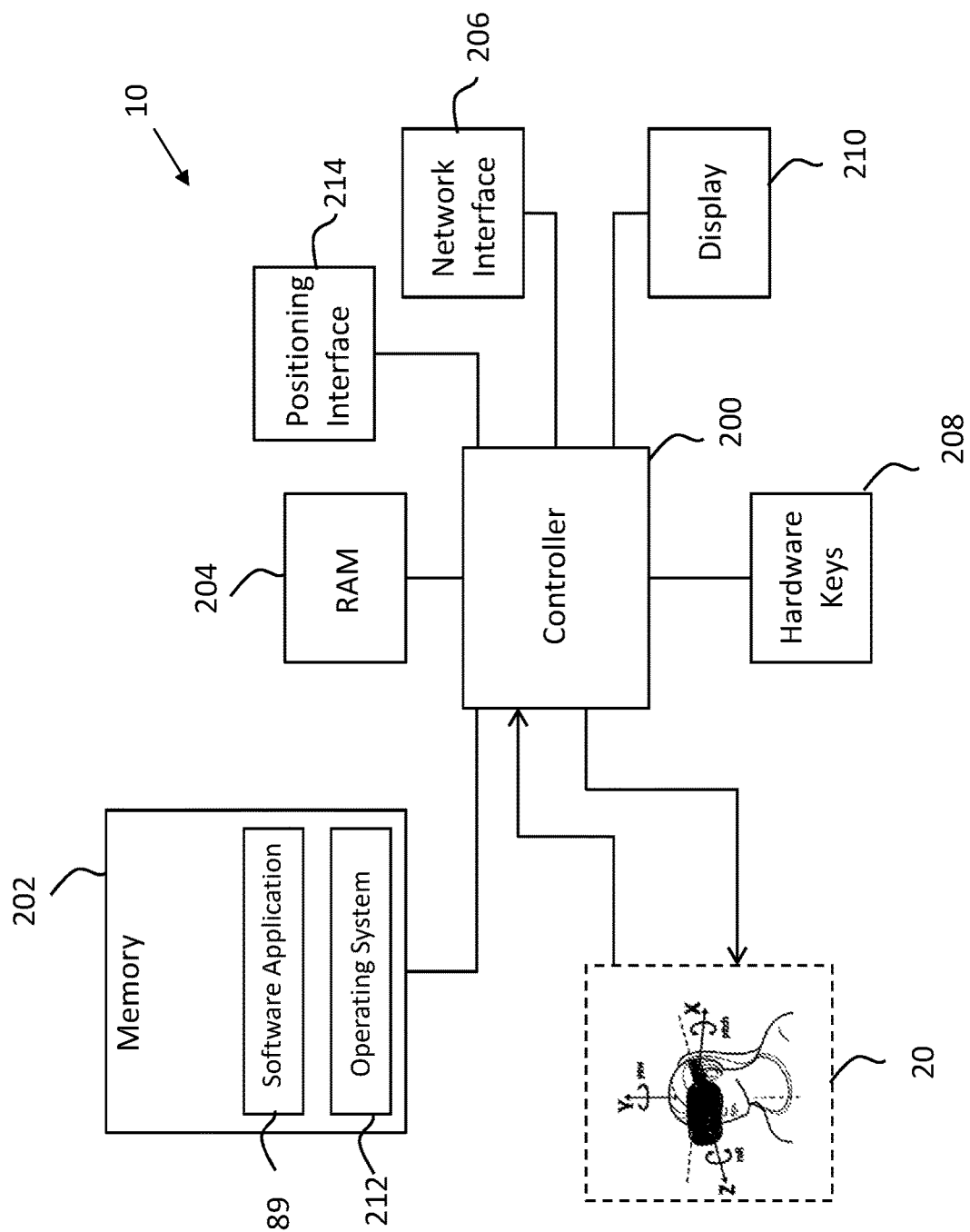
FIG. 15 is a schematic diagram of components of a virtual reality media player in accordance with example embodiments.

For completeness, FIG. 15 shows a schematic diagram of components of the virtual reality media player 10. The virtual reality media player 10 may have a controller 200, memory 202 and Random Access Memory, RAM 204. The virtual reality media player 10 may comprise a network interface 206 for connection to the network 40, e.g. a modem which may be wired or wireless. The virtual reality media player 10 may also receive positional signals from the virtual reality headset 20 and outputs video and/or audio content for one or more virtual spaces to the virtual reality headset 20. The virtual reality media player 10 may comprise a positioning interface 214 capable of receiving positioning signals for determining the player 10 location. The virtual reality media player 10 may use for example GPS or indoor-positioning methods for locating the device. The positional signals may be indicative of user position/orientation. The controller 200 is connected to each of the other components in order to control operation thereof.

The memory 202 may be a non-volatile memory such as read only memory (ROM), a hard disk drive (HDD) or a solid state drive (SSD). The memory 202 stores, amongst other things, an operating system 212 and the software application 89. The RAM 204 is used by the controller 200 for the temporary storage of data. The operating system 212 may contain code which, when executed by the controller 200 in conjunction with the RAM 204, controls operation of each of the hardware components.

The controller 200 may take any suitable form. For instance, it may be a microcontroller, plural microcontrollers, a processor, or plural processors.

In some example embodiments, the virtual reality media player 10 may also be associated with external software applications or virtual reality content data not stored on the memory 202. These may be applications or virtual reality content data stored on a remote server device and may run partly or exclusively on the remote server device. These applications or virtual reality content data may be termed cloud-hosted applications or data. The virtual reality media player 10 may be in communication with the remote server device in order to utilize the software application or data stored there.

The above example embodiments therefore provided an intuitive and useful way of allowing a user located within a given real-world space of limited dimensions to navigate a virtual space extending outside the real-world space. The embodiments may avoid or reduce the chance that the user will collide with boundaries or objects in the real world space by allowing the user to navigate the virtual space without moving beyond the boundary. Embodiments may be particularly useful for virtual reality applications involving six degrees of freedom exploration. The embodiments may also provide an interesting, intuitive and enjoyable user experience, and may reduce the amount of effort required to explore the virtual space(s), which may be useful for users with limited movement ability.

It will be appreciated that the above described example embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
   circuitry configured to provide virtual reality video content in a virtual space;
   circuitry configured to determine selection of an object of interest in the virtual space; and
   circuitry configured to scale a representation of a user in the virtual space based at least on (i) a first distance in the virtual space between the user and the object of interest, and (ii) a second distance between a physical location of the user in a real-world space and a boundary in the real-world space.

2. The apparatus of claim 1, further comprising:
   circuitry configured to determine a scaling factor, wherein the scaling factor is proportional to the first distance divided by the second distance; and
   wherein the circuitry configured to scale the representation of the user in the virtual space is arranged to scale the representation of the user in the virtual space based on the scaling factor.

3. The apparatus according to claim 1, wherein the circuitry configured to scale the representation of the user is arranged to scale the representation of the user in the virtual space by increasing a speed at which the representation of the user traverses the virtual space towards the object of interest.

4. The apparatus according to claim 3, wherein circuitry configured to scale the representation of the user is arranged to decrease the speed at which the representation of the user traverses the virtual space towards the object of interest in response to determining that the representation of the user has traversed the virtual space to a location less than a threshold distance from the object of interest.

5. The apparatus according to claim 3, wherein the circuitry configured to scale the representation of the user is arranged to decrease the speed at which the representation of the user traverses the virtual space as the representation of the user moves closer to the object of interest in the virtual space.

6. The apparatus according to claim 1, wherein the circuitry configured to scale the representation of the user is arranged to scale the representation of the user by increasing a height of the representation of the user in the virtual space such that the user perceives an increase in their height.

7. The apparatus according to claim 6, wherein the circuitry configured to scale the representation of the user is arranged to decrease the height of the representation of the user in the virtual space in response to determining that the representation of the user has traversed the virtual space to a location less than a threshold distance from the object of interest.

8. The apparatus according to claim 6, wherein the circuitry configured to scale the representation of the user is arranged to decrease the height of the representation of the user as the representation of the user moves closer to the object of interest in the virtual space.

9. The apparatus according to claim 1, wherein the circuitry configured to determine selection of an object of interest is arranged to determine selection of the object of interest by determining a gesture of the user indicating selection of the object of interest.

10. The apparatus according to claim 1, wherein the circuitry configured to determine selection of an object of interest is arranged to determine selection of the object of interest by using at least one of gaze tracking or head tracking of the user.

11. The apparatus according to claim 1, wherein the circuitry configured to determine selection of an object of interest is arranged to determine selection of the object of interest based on a duration of time which at least part of the user has been in a particular orientation and/or location.

12. The apparatus according to claim 1, wherein the circuitry configured to determine selection of an object of interest is arranged to determine selection of the object of interest by:
   determining an orientation of the user in the virtual space; and
   selecting an object in front of the user in the virtual space as the object of interest.

13. A method comprising:
   providing virtual reality video content in a virtual space;
   determining selection of an object of interest in the virtual space; and
   scaling a representation of a user in the virtual space based at least on (i) a first distance in the virtual space between the user and the object of interest, and (ii) a second distance between a physical location of the user in a real-world space and a boundary in the real-world space.

14. The method according to claim 13, further comprising:
   determining a scaling factor, wherein the scaling factor is proportional to the first distance divided by the second distance;
   wherein the scaling of the representation of the user in the virtual space is based on the scaling factor.

15. The method according to claim 13, wherein the scaling of the representation of the user in the virtual space comprises increasing a speed at which the representation of the user traverses the virtual space towards the object of interest.

16. The method according to claim 15, wherein the scaling of the representation of the user in the virtual space comprises decreasing the speed at which the representation of the user traverses the virtual space towards the object of interest in response to determining that the representation of the user has traversed the virtual space to a location less than a threshold distance from the object of interest.

17. The method according to claim 15, wherein the scaling of the representation of the user in the virtual space comprises decreasing the speed at which the representation of the user traverses the virtual space as the representation of the user moves closer to the object of interest in the virtual space.

18. The method according to claim 13, wherein the scaling of the representation of the user in the virtual space comprises increasing a height of the representation of the user in the virtual space such that the user perceives an increase in their height.

19. The method according to claim 18, wherein the scaling of the representation of the user in the virtual space comprises decreasing the height of the representation of the user in the virtual space in response to determining that the representation of the user has traversed the virtual space to a location less than a threshold distance from the object of interest.

20. A computer program encoded on a non-transitory computer readable medium, the computer program comprising instructions that when executed by a computer cause it to perform:
   providing virtual reality video content in a virtual space;
   determining selection of an object of interest in the virtual space; and
   scaling a representation of a user in the virtual space based at least on (i) a first distance in the virtual space between the user and the object of interest, and (ii) a second distance between a physical location of the user in a real-world space and a boundary in the real-world space.

* * * * *